S. P. Ruggles.
Meter.
N° 88,215. Patented Mar. 23, 1869.
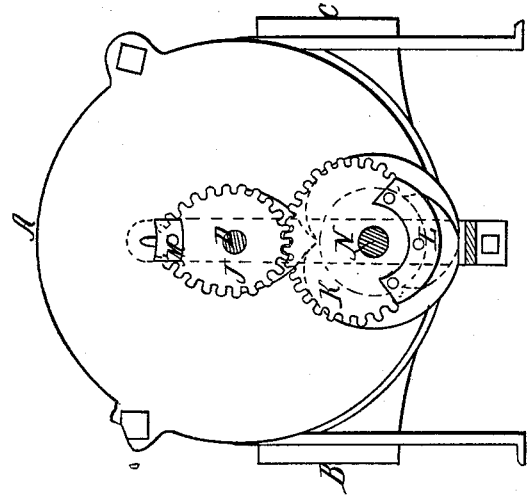
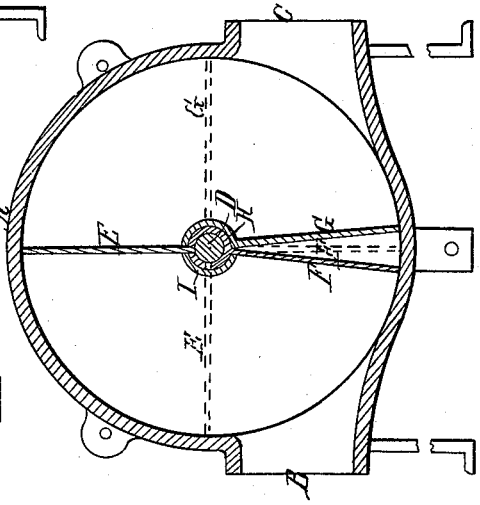
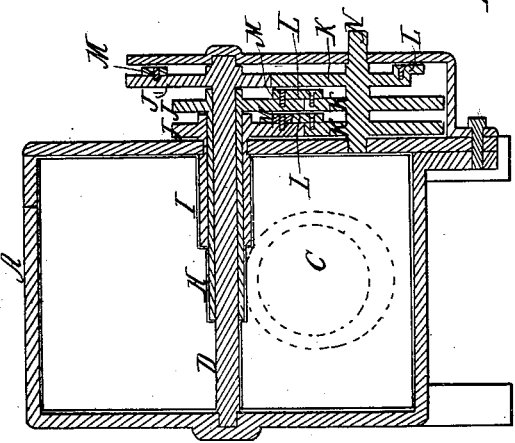
Witnesses;
Geo. P. Wheeler
John M. Freeman
Inventor;
Stephen P. Ruggles.

STEPHEN P. RUGGLES, OF BOSTON, ASSIGNOR TO J. HERBERT SHEDD, OF WALTHAM, MASSACHUSETTS.

Letters Patent No. 88,215, dated March 23, 1869.

IMPROVEMENT IN METERS.

The Schedule referred to in these Letters Patent and making part of the same.

*To all whom it may concern:*

Be it known that I, STEPHEN P. RUGGLES, of Boston, in the county of Suffolk, and State of Massachusetts, have invented a new and useful Improvement in Meters, which may also be used as a motor, rotary pump, or blower; and I do hereby declare that the following is a full and exact description thereof, reference being had to the accompanying drawings, and to the letters of reference marked thereon.

My invention is an improvement upon the invention for which a patent was granted to J. Herbert Shedd and William Edson, on the 19th day of January, 1864; and consists in the addition of a third fan, performing the uses hereinafter specified.

Figure 1 is a cross-section through the chamber, showing the positions of the fans, or blades.

Figure 2 is a longitudinal section.

Figure 3 is an end elevation.

A is a cylinder, or chamber, closed at the ends.

B is an opening in the side of the chamber, for an outlet.

O is another opening in the side of the chamber, for an inlet.

D is a shaft in the middle of the chamber, to which is attached the fan, or blade E, and which serves also as an axis for the fans, or blades F and G.

H is a hollow shaft, or collar, playing around the shaft D, to which is attached the fan F.

I is a hollow shaft, playing around the hollow shaft H, to which is attached the fan G.

J J J are gear-wheels, formed to produce the desired motions of the fans, one of which is permanently attached to each fan through its shaft, or collar.

K K K are gear-wheels fixed to the driving-shaft N, in such positions as to preserve the proper respective distances of the fans, and answering to the gear-wheels J J J, but having each a space in the circumference without teeth, to allow its own continuous motion, while its answering gear-wheel J is stationary.

L L L are segmental guide-plates attached to the gears K K K, and moving in the plates M M M, attached to the gear-wheels J J J, to prevent the motion of the gears J J J, and to keep their respective fans stationary for the time required, when they arrive at O.

These fans extend, each, from its axis to the circumference of the chamber, and are so attached to their respective shafts that their motion may be independent, each of the other.

The operation is as follows:

By motion communicated through the shafts, the fans are made to revolve around the axis, in the direction indicated by the arrow, driving before them fluid taken at O and expelled at B. To secure this operation, each of the fans in turn is made to stop and remain stationary, as a fixed diaphragm, at O, while another, acting as a plunger, is driving the fluid before it through B.

The rotary pump patented by Shedd and Edson, as heretofore mentioned, was made with two fans, or blades, each connected to a central shaft, and operating in a similar way, as above described; but my invention consists in using three fans, or blades; and by the use of the third fan, a new and valuable result is gained, as follows:

When two fans only are used, the edges of the fans must be made wide enough to cover the ports, when passing them, and thus, for a time, prevent ingress or egress of fluid, or else a passage will be opened between the outlet and inlet, allowing the fluid to run through at its will, without affecting or being controlled by the fans. When the machine is used as a blower, or pump, this open passage may allow a backward movement of the fluid. When used as a motor, or meter, the open passage causes a loss of power or of fluid; and if the apparatus should stop, so as to allow this open passage, the fans being acted upon equally by the pressure of the fluid, when it is again set in motion, would remain at rest, and some device would be necessary to set them in motion.

If the edges of the fans be wide enough to cover the ports in passing, and the fans stop in this position, the fluid has no power to set them in motion.

By the use of the third fan, I overcome this difficulty completely, for, as soon as the edge of the fan, that has been acting as a diaphragm, comes to the port of ingress, a second fan, by a proper adjustment of their relative motion, has passed the port of egress, and takes its place as a diaphragm, while the third is acting as a plunger. Thus there is, at all times, one fan acting as a diaphragm, and another as a plunger, the third being practically idle while passing the ports.

What I claim as my invention, and desire to secure by Letters Patent, is—

The combination of the cylinder A, revolving shafts D H I, and radial pistons E F G, by means of which one piston serves alternately as an abutment, while the other revolves, all substantially as described.

Signed at Boston, Massachusetts, April 21, 1868.

STEPHEN P. RUGGLES.

Witnesses:
GEORGE P. WHEELER,
JOHN M. FREEMAN.